United States Patent
Jiao

(10) Patent No.: US 11,688,526 B2
(45) Date of Patent: Jun. 27, 2023

(54) ELECTRICALLY CONDUCTIVE POLYESTER COMPOSITIONS

(71) Applicant: DuPont Polymers, Inc., Wilmington, DE (US)

(72) Inventor: Yunfeng Jiao, Shanghai (CN)

(73) Assignee: DuPont Polymers, Inc., Wilmington, DE (US)

( * ) Notice: Subject to any disclaimer, the term of this patent is extended or adjusted under 35 U.S.C. 154(b) by 304 days.

(21) Appl. No.: 17/268,787

(22) PCT Filed: Aug. 15, 2019

(86) PCT No.: PCT/US2019/046650
§ 371 (c)(1),
(2) Date: Feb. 16, 2021

(87) PCT Pub. No.: WO2020/037122
PCT Pub. Date: Feb. 20, 2020

(65) Prior Publication Data
US 2021/0375500 A1    Dec. 2, 2021

(30) Foreign Application Priority Data
Aug. 17, 2018  (CN) .......................... 201810945146.1

(51) Int. Cl.
*H01B 1/24*    (2006.01)
*C08L 67/00*   (2006.01)
*H01B 1/12*    (2006.01)
*C08L 67/02*   (2006.01)

(52) U.S. Cl.
CPC .............. *H01B 1/124* (2013.01); *C08L 67/02* (2013.01); *H01B 1/24* (2013.01); *C08L 2203/20* (2013.01); *C08L 2205/06* (2013.01); *C08L 2207/04* (2013.01)

(58) Field of Classification Search
CPC .... H01B 1/00; H01B 1/24; C09D 5/24; C08L 2203/20; C08L 67/02
See application file for complete search history.

(56) References Cited

U.S. PATENT DOCUMENTS

| | | | |
|---|---|---|---|
| 2007/0244227 A1* | 10/2007 | Eipper | C08L 67/02 523/400 |
| 2010/0032611 A1* | 2/2010 | Fukuhara | C09K 5/14 252/70 |
| 2010/0048813 A1* | 2/2010 | Clauss | C08G 63/78 524/604 |
| 2011/0204298 A1* | 8/2011 | Chang | C08K 3/041 252/511 |

OTHER PUBLICATIONS

English language machine translation of WO/2012/098109 (pub date Jul. 2012).*
Taniguchi et al "Preparation of hyperbranched carbon black by grafting of hyperbranched polyester onto the surface", Materials Chemistry and Physics 108 (2008) 397-402).*
Xu et al "Preparation of nanoscale carbon black dispersion using hyper-branched poly(styrene-alt-maleic anhydride)", Progress in Organic Coatings 75 (2012) 537-542.*

* cited by examiner

*Primary Examiner* — Mark Kopec
(74) *Attorney, Agent, or Firm* — Dority & Manning, P.A.

(57) ABSTRACT

Disclosed herein are electrically conductive thermoplastic polyester compositions comprising: a) at least one thermoplastic polyester; b) conductive carbon black; c) at least one ethylene copolymer based impact modifier; and d) at least one hyperbranched polyester having an acid number of about 80-340 mg KOH/g.

9 Claims, No Drawings

ELECTRICALLY CONDUCTIVE POLYESTER COMPOSITIONS

CROSS-REFERENCE TO RELATED APPLICATION

This application claims priority to Chinese Application. No. 201810945146.1 filed on Aug. 17, 2018, which is incorporated herein by reference in its entirety.

FIELD OF DISCLOSURE

This invention relates to electrically conductive polyester compositions with superior toughness.

BACKGROUND

Due to its moldability, dimensional stability, chemical resistance, heat resistance, and color stability, thermoplastic polyesters have been used in automotive parts, electric/electronic components, and many other applications. It has been known that ethylene copolymer based impact modifiers and conductive carbon blacks can be added into polyesters to improve the mechanical strength (e.g., tensile strength and impact resistance) and electrical conductivity thereof, respectively. However, it has been a challenge to improve both the mechanical strength and electrical conductivity in a polyester composition, as the combined addition of ethylene copolymer based impact modifiers and conductive carbon blacks into polyesters can negatively affect the conductivity of the compositions, compared to those that contain conductive carbon blacks alone. Thus, there is still a need to develop a method to improve the mechanical strength and electrical conductivity in polyesters simultaneously.

SUMMARY

Provided herein is an electrically conductive polymer composition comprising: a) at least one thermoplastic polyester; b) about 2-15 wt % conductive carbon black; c) about 4-30 wt % at least one ethylene copolymer based impact modifier; and d) about 0.1-4 wt % at least one hyperbranched polyester having an acid number of about 80-340 mg KOH/g, with the total wt % of the composition totaling to 100 wt %.

In one embodiment of the electrically conductive polymer composition, the composition comprises the at least one thermoplastic polyester at a level of about 30-95 wt %, or about 35-92 wt %, or about 40-88 wt %, based on the total weight of the composition.

In a further embodiment of the electrically conductive polymer composition, the at least one thermoplastic polyester is selected from the group consisting of PET, PBT, PCT, and combinations of two or more thereof, or, the at least one thermoplastic polyester is PBT.

In a yet further embodiment of the electrically conductive polymer composition, the at least one hyperbranched polyester has a degree of branching (DB) ranging from about 10-99.9%, or ranging from about 20-99%, or ranging from about 20-95%.

In a yet further embodiment of the electrically conductive polymer composition, the at least one hyperbranched polyester has an acid number of about 90-330 mg KOH/g, or an acid number of about 100-320 mg KOH/g.

In a yet further embodiment of the electrically conductive polymer composition, the at least one hyperbranched polyester is present at a level of about 0.2-3.5 wt % or about 0.3-3 wt %, based on the total weight of the composition.

In a yet further embodiment of the electrically conductive polymer composition, the conductive carbon black is present at a level of about 2.5-13 wt % or about 3-11 wt %, based on the total weight of the composition.

In a yet further embodiment of the electrically conductive polymer composition, the ethylene copolymer based impact modifier is present at a level of about 6-25 wt % or about 8-20 wt %, based on the total weight of the composition.

Further provided herein is an article formed of the electrically conductive polymer composition described above.

DETAILED DESCRIPTION

Disclosed herein are electrically conductive thermoplastic polyester compositions comprising: a) at least one thermoplastic polyester; b) conductive carbon black; c) at least one ethylene copolymer based impact modifier; and d) at least one hyperbranched polyester having an acid number of about 80-340 mg KOH/g.

The term "thermoplastic polymer" is used herein referring to polymers that turn to a liquid when heated and freeze to a rigid state when cooled sufficiently. In accordance with the present disclosure, suitable thermoplastic polyesters include, without limitation, polyethylene terephthalate (PET), polybutylene terephthalate (PBT), polytrimethylene terephthalate (PTT), polycyclohexylene dimethylene terephthalate (PCT), etc. The thermoplastic polyesters used herein may also be obtained commercially from various vendors. For example, suitable PET may be obtained from E.I. du Pont de Nemours and Company (U.S.A.) (hereafter "DuPont") under the trade name Rynite®; suitable PBT may be obtained from DuPont under the trade name Crastin®; suitable PTT may be obtained from DuPont under the trade name Sorona®; suitable PCT may be obtained from Celanese Corporation (Switzerland), under the trade name Thermx™.

In accordance with the present disclosure, about 30-95 wt %, or about 35-92 wt %, or about 40-88 wt % of the thermoplastic polyester may be present in the composition, based on the total weight of the composition.

Particle size, particle structure, porosity, or volatile content of conductive carbon black fillers may influence conductivity. The preferred conductive carbon black has a small particle size to provide more particles per unit volume for reducing the interparticle distance. Such carbon black may also have a high structure to increase the conductive path through which the electrons travel as they traverse through the carbon. Wishing not to be bound by theory, with high structure, the number of insulative gaps is reduced and the electrons travel through the carbon black with less resistance, providing a more conductive carbon black. In certain embodiments, carbon black with high porosity may be used to yield more particles per unit weight, as when compared to less porous particles, more porous carbon blacks may serve to further decrease the interparticle distance, providing higher conductivity results. Further, low volatile content carbon black may be used for promoting electron tunneling through the carbon black and, in turn, higher conductivity.

The conductive carbon black fillers used herein may be defined by their structure, as defined by dibutyl phthalate (DBP) absorption. DBP absorption may be measured according to ASTM Method Number D3493. The DBP absorption has been related to the structure of carbon black within the art. High structure carbon black typically also has high BET surface areas. The BET surface areas of carbon blacks may be measured by ASTM Method Number D6556. This method measures the nitrogen adsorption of the carbon black.

The conductive carbon black used herein may have a DBP absorption of about 150-600 cc/100 g. It may further have a BET surface area of about 500-2000 m²/g. Suitable conductive carbon black fillers also are available commercially. For example, suitable conductive carbon black may be obtained from Cabot Corporation (U.S.A.) under the trade names Black Pearls™ 2000 or Vulcan™ XCmax™ 22; or from AkzoNobel Polymer Chemistry (the Netherland) under the trade names Ketjenblack™ EC600JD or EC300J; or from Orion Engineered Carbons S.A. (Luxembourg) under the trade name Printex™ XE2-B.

In accordance with the present disclosure, the conductive carbon black may be present in the composition at a level of about 2-15 wt %, or about 2.5-13 wt %, or about 3-11 wt %, based on the total weight of the composition.

As used herein, the term "ethylene copolymer based impact modifier" refers to a polymer derived from (e.g. made from) ethylene and at least one additional monomers.

The ethylene copolymer based impact modifier used herein is at least one random polymer made by polymerizing monomers (a) ethylene; (b) one or more olefins of the formula $CH_2=C(R^1)CO_2R^2$, wherein $R^1$ is hydrogen or an alkyl group with 1-8 carbon atoms and $R^2$ is an alkyl group with 1-8 carbon atoms, such as methyl, ethyl, or butyl; and optional (c) one or more olefins of the formula $CH_2=C(R^3)CO_2R^4$, wherein $R^3$ is hydrogen or an alkyl group with 1-6 carbon atoms, such as methyl, and $R^4$ is glycidyl. In certain embodiments, monomers (b) are butyl acrylates. One or more of n-butyl acrylate, tert-butyl acrylate, iso-butyl acrylate, and sec-butyl acrylate may be used. In a further embodiment, the ethylene copolymer based impact modifier used herein is derived from ethylene, butyl acrylate, and glycidyl methacrylate and commonly referred to as E/BA/GMA. Repeat units derived from monomer (a) will comprise about 20-95 wt %, or about 20-90 wt %, or about 40-90 wt %, or about 50-80 wt % of the total weight of the ethylene copolymer based impact modifier. Repeat units derived from monomer (b) will comprise about 3-70 wt %, or about 3-40 wt %, or about 15-35 wt %, or about 20-35 wt % of the total weight of the ethylene copolymer based impact modifier. Repeat units derived from the optional monomer (c), if present, may comprise about 0.5-25 wt %, or about 2-20 wt %, or about 3-17 wt % of the total weight of the ethylene copolymer based impact modifier.

The ethylene copolymer based impact modifier may additionally be derived from optional (d) carbon monoxide (CO) monomers. When present, repeat units derived from carbon monoxide will preferably comprise up to about 20 wt % or about 3-15 wt % of the total weight of the ethylene copolymer based impact modifier.

In accordance with the present disclosure, the ethylene copolymer based impact modifier may be present in the composition at a level of about 4-30 wt %, or about 6-25 wt %, or about 8-20 wt %, based on the total weight of the composition.

The hyperbranched polyesters are molecularly and structurally nonuniform polyesters and may contain one or more functional groups selected from OH, COOH, and COOR groups. The radical R in the esterified carboxyl group may comprise groups having from 1 to 60 carbon atoms. The groups may also contain heteroatoms or further substituents. Examples of R include $C_1$-$C_8$ alkyl radicals, such as methyl, ethyl, propyl, isopropyl, n-butyl, i-butyl, t-butyl, hexyl, octyl radicals, or $C_6$-$C_{12}$ aryl or arylalkyl radicals such as benzyl radicals.

The functional groups are essentially terminal groups, although the functional groups may also be arranged pendantly.

In certain embodiments, the hyperbranched polyester used herein contains both OH and COOH groups.

The hyperbranched polyesters used herein may have an acid number of about 80-340 mg KOH/g, or about 90-330 mg KOH/g, or about 100-320 mg KOH/g.

Further, the hyperbranched polyesters used herein may have a degree of branching (DB), i.e. the average number of dendritic linkages plus the average number of end groups per molecule, ranging from about 10-99.9%, or from about 20-99%, or from about 20 to 95%.

The hyperbranched polyesters may be synthesized by any suitable process. For example, the reaction solutions reacted may comprise:

(a) one or more dicarboxylic acids or one or more derivatives thereof with one or more alcohols having a functionality of at least three, (b) or one or more tricarboxylic acids or higher polycarboxylic acids or one or more derivatives thereof with one or more diols, (c) or one or more tricarboxylic acids or higher polycarboxylic acids or one or more derivatives thereof with one or alcohols having a functionality of at least three, (d) or one or more dihydroxy or polyhydroxycarboxylic acids, (e) or one or more hydroxydicarboxylic or hydroxypolycarboxylic acids, or mixtures of at least two of the above reaction solutions.

It is also possible to react mixtures of at least two of the above reaction solutions of variants (a) to (e).

In the simplest case the reaction solutions consist only of the mixtures of the components which are to be reacted with one another. The reaction solutions also may include solvents, suitable esterification or transesterification catalysts, and also, where appropriate, further additives.

The polymerization takes place customarily by heating at temperatures from about 50-200° C. The polymerization may be conducted in the presence of a solvent. Suitable examples include hydrocarbons such as paraffins or aromatics.

After the end of the reaction the highly functional hyperbranched polyesters can be isolated, for example, by removal of the catalyst by filtration and concentration of the filtrate, said concentration customarily being conducted under reduced pressure. Other highly suitable methods of working up the reaction mixture are precipitation following the addition of water, with subsequent washing and drying.

Hyperbranched polyesters used herein also may be obtained commercially. For example, suitable hyperbranched polyesters may be obtained from Wuhan Hyper-Branched Polymers Science & Technology Co. Ltd. (China) under the product names HyPer C10, HyPer C20, HyPer C30, or HyPer C40; or from Weihai CY Dendrimer Technology Co. Ltd. (China) under the product name CYD-C600.

In accordance with the present disclosure, the hyperbranched polyesters may be present in the composition at a level of about 0.1-4 wt %, or about 0.2-3.5 wt %, or about 0.3-3 wt %, based on the total weight of the composition.

The electrically conductive polyester composition disclosed herein may further comprise other additives, such as colorants, antioxidants, UV stabilizers, UV absorbers, heat stabilizers, lubricants, viscosity modifiers, nucleating agents, plasticizers, mold release agents, scratch and mar modifiers, impact modifiers, emulsifiers, optical brighteners, antistatic agents, acid adsorbents, smell adsorbents, anti-hydrolysis agents, anti-bacterial agents, density modifiers, reinforcing fillers, thermal conductive fillers, electrical conductive fillers, coupling agents, end-capping reagents and combinations of two or more thereof. Based on the total weight of the electrically conductive polyester composition disclosed herein, such additional additive(s) may be present at a level of about 0.005-30 wt % or about 0.01-25 wt %, or about 0.02-20 wt %.

As demonstrated herein, the polyester composition disclosed herein possess high conductivity while maintaining superior mechanical properties (such as tensile strain at break and impact resistance).

Further disclosed herein are articles formed of the electrically conductive polyester compositions disclosed herein. Such electrically conductive polyester compositions can be used in many areas including electro plating and anti-static and electromagnetic shielding. Exemplary articles formed of the electrically conductive polyester composition, include, without limitation, structural parts or housings for electronic devices, printer and copier accessories, and packaging for electronic components.

EXAMPLES

Materials

PBT—Polybutylene terephthalate resin purchased from Chang Chun Plastics Co., Ltd (Taiwan) under the product name CCP PBT 1100-211D;

CB—Conductive carbon black purchased from AkzoNobel under the trade name Ketjenblack™ EC600JD and having a DBP absorption value of 495 cm$^3$/100 g, and BET surface area of 1270 m$^2$/g;

Mica—Mica purchased from Yamaguchi Mica Co., Ltd. (Japan) under the product name YM-31;

AO (Anti-oxidant)—Pentaerythritol tetrakis(3-(3,5-di-tert-butyl-4-hydroxyphenyl)propionate) purchased from BASF (Germany) under the trade name IRGANOX™ 1010;

Lubricant—Pentaerythritol tetrastearate purchased from Emery Oleochemicals (Malaysia) under the trade name LOXIOL™ P861/3.5.

RA (Releasing agent)—Zinc stearate purchased from Sinopharm Chemical Reagent Co., Ltd. (China);

Impact modifier—Copolymer of ethylene, butylacrylate and glycidyl methacrylate purchased from DuPont under the trade name Elvaloy® PTW;

HBP-1—Hyperbranched polyester, purchased from Wuhan HyperBranched Polymers Science & Technology Co. Ltd. under the product name HyPer H102, and with an acid number of 20 mg KOH/g and a degree of branching (DB) of 50-60%;

HBP-2—Hyperbranched polyester (purchased from Weihai CY Dendrimer Technology Co. Ltd. under the product name CYD-T1050), with an acid number of 50 mg KOH/g and a degree of branching (DB) of 60-70%;

HBP-3—Hyperbranched polyester, purchased from Wuhan HyperBranched Polymers Science & Technology Co. Ltd. under the product name HyPer C403), and with an acid number of 120 mg KOH/g and a degree of branching (DB) of 60-65%;

HBP-4—Hyperbranched polyester, purchased from Wuhan HyperBranched Polymers Science & Technology Co. Ltd. under the product name HyPer C103, and with an acid number of 220 mg KOH/g and a degree of branching (DB) of 50-60%.

HBP-5—Hyperbranched polyester, purchased from Wuhan HyperBranched Polymers Science & Technology Co. Ltd. under the product name HyPer C101, and with an acid number of 300 mg KOH/g and a degree of branching (DB) of 50-60%.

HBP-6—Hyperbranched polyester, purchased from Weihai CY Dendrimer Technology Co. Ltd. under the product name CYD-C2, and with an acid number of 360 mg KOH/g and a degree of branching (DB) of 60-65%.

In each CE1-CE6 and E1-E5, a polymer composition (all components listed in Table 1) was prepared by compounding in a ZSK26MC twin-screw extruder (manufactured by Coperion GmbH (Germany)). The barrel temperatures were set at about 250° C., screw speed at about 300 rpm, and output speed at about 20 kg/h. After exiting the extruder, the pellets were molded into ISO527 type 1A specimens and 100×100×2 mm cube pieces using a 180T molding machine (manufactured by Sumitomo Corporation (Japan)) with the melt temperature and mold temperature set at about 260° C. and about 90° C., respectively.

The ISO527 type 1A specimens were used to determine the tensile strain at break using an Instron 3367 tensile test machine (manufactured by Instron (U.S.A.)) in accordance with ISO527-2:2012 and to determine the Notched-Charpy impact using CEAST 9050 impact pendulum (manufactured by Instron) in accordance with ISO 179-1 standard. While the 100×100×2 mm cube pieces were used to determine the volume resistivity of the compositions using RT-3000S/RG-7 four-point probe resistivity testing system (manufactured by Napton Corporation (Japan)).

As demonstrated below, when conductive carbon black is added into PBT, although the volume resistivity was as low as 33, the tensile strain at break and Notched-Charpy impact were too low (CE1). The further addition of ethylene copolymer based impact modifier (see CE2) improved the tensile strain at break and Notched-Charpy impact, but however, also caused the volume resistivity of the composition increased. And as demonstrated by E1-E5, by adding hyperbranched polyesters with acid numbers of 120 mg KOH/g, 220 mg KOH/g, or 300 mg KOH/g, the goal of obtaining PBT compositions with high tensile strain at break and Notched-Charpy impact resistance and low volume resistivity were achieved.

TABLE 1

| | CE1 | CE2 | CE3 | CE4 | CE5 | CE6 | E1 | E2 | E3 | E4 | E5 |
|---|---|---|---|---|---|---|---|---|---|---|---|
| Compositions | | | | | | | | | | | |
| PBT | 84.3 | 70.3 | 69.3 | 69.3 | 69.8 | 69.3 | 69.3 | 69.8 | 68.3 | 69.3 | 69.3 |
| CB | 5 | 5 | 5 | 5 | 5 | 5 | 5 | 5 | 5 | 5 | 5 |
| RA | 0.1 | 0.1 | 0.1 | 0.1 | 0.1 | 0.1 | 0.1 | 0.1 | 0.1 | 0.1 | 0.1 |
| AO | 0.3 | 0.3 | 0.3 | 0.3 | 0.3 | 0.3 | 0.3 | 0.3 | 0.3 | 0.3 | 0.3 |

TABLE 1-continued

|  | CE1 | CE2 | CE3 | CE4 | CE5 | CE6 | E1 | E2 | E3 | E4 | E5 |
|---|---|---|---|---|---|---|---|---|---|---|---|
| Lubricant | 0.3 | 0.3 | 0.3 | 0.3 | 0.3 | 0.3 | 0.3 | 0.3 | 0.3 | 0.3 | 0.3 |
| Mica | 10 | 10 | 10 | 10 | 10 | 10 | 10 | 10 | 10 | 10 | 10 |
| Impact Modifier | — | 14 | 14 | 14 | 14 | 14 | 14 | 14 | 14 | 14 | 14 |
| HBP-1 | — | — | 1 | — | — | — | — | — | — | — | — |
| HBP-2 | — | — | — | 1 | 0.5 | — | — | — | — | — | — |
| HBP-3 | — | — | — | — | — | — | — | — | — | — | — |
| HBP-4 | — | — | — | — | — | — | 1 | 0.5 | 2 | — | — |
| HBP-5 | — | — | — | — | — | — | — | — | — | 1 | — |
| HBP-6 | — | — | — | — | — | 1 | — | — | — | — | 1 |
| Properties | | | | | | | | | | | |
| Volume Resistivity (ohm · cm) | 33 | $10^5$ | $10^5$ | $10^4$ | $10^5$ | $10^3$ | 48 | 80 | 38 | 110 | 62 |
| Tensile strain at break (%) | 1.39 | 5.39 | 3.5 | 3.8 | 3.6 | 3.8 | 5.6 | 4.4 | 6.2 | 4.3 | 5.8 |
| Notched-Charpy impact (kJ/m$^2$) | 1.55 | 5.22 | 5.1 | 5.3 | 5.0 | 5.4 | 6.8 | 5.8 | 7.9 | 6.1 | 6.4 |

I claim:

1. An electrically conductive polymer composition comprising: a) at least one thermoplastic polyester; b) about 2-15 wt % conductive carbon black; c) about 4-30 wt % at least one ethylene copolymer based impact modifier; and d) about 0.1-4 wt % at least one hyperbranched polyester having an acid number of about 80-340 mg KOH/g, with the total wt % of the composition totaling to 100 wt %.

2. The electrically conductive polymer composition of claim 1, which comprises the at least one thermoplastic polyester at a level of about 30-95 wt %, based on the total weight of the composition.

3. The electrically conductive polymer composition of claim 1, wherein, the at least one thermoplastic polyester is selected from the group consisting of PET, PBT, PCT, and combinations of two or more thereof.

4. The electrically conductive polymer composition of claim 1, wherein, the at least one hyperbranched polyester has a degree of branching (DB) ranging from about 10-99.9%.

5. The electrically conductive polymer composition of claim 1, wherein, the at least one hyperbranched polyester has an acid number of about 90-330 mg KOH/g.

6. The electrically conductive polymer composition of claim 1, wherein, the at least one hyperbranched polyester is present at a level of about 0.2-3.5 wt %, based on the total weight of the composition.

7. The electrically conductive polymer composition of claim 1, wherein, the conductive carbon black is present at a level of about 2.5-13 wt %, based on the total weight of the composition.

8. The electrically conductive polymer composition of claim 1, wherein, the ethylene copolymer based impact modifier is present at a level of about 6-25 wt %, based on the total weight of the composition.

9. An article formed of the electrically conductive polymer composition of claim 1.

* * * * *